United States Patent [19]

Avery

[11] Patent Number: 4,836,096
[45] Date of Patent: Jun. 6, 1989

[54] VARIABLE AIR VOLUME AIR DISTRIBUTION SYSTEM

[76] Inventor: Gil Avery, P.O. Box 341165, Memphis, Tenn. 38184

[21] Appl. No.: 273,094

[22] Filed: Nov. 18, 1988

[51] Int. Cl.$^4$ .............................................. F24F 7/08
[52] U.S. Cl. ..................................... 98/34.5; 98/34.6; 165/16
[58] Field of Search ..................... 98/1.5, 34.5, 34.6; 165/16

[56] References Cited

U.S. PATENT DOCUMENTS

| | | | |
|---|---|---|---|
| Re. 28,946 | 8/1976 | Martz et al. | 98/34.5 X |
| 3,611,906 | 10/1971 | Lorenz | 98/33.1 |
| 3,887,127 | 6/1975 | Jauss | 236/91 |
| 4,073,433 | 2/1978 | Modes | 236/49 |
| 4,145,161 | 3/1979 | Skinner | 417/22 |
| 4,174,065 | 11/1979 | Knauth | 236/49 |
| 4,189,094 | 2/1980 | Robinson | 236/46 R |
| 4,191,511 | 3/1980 | Stewart et al. | 417/18 |
| 4,228,849 | 10/1980 | Heinola | 165/16 X |
| 4,251,027 | 2/1981 | Dehart et al. | 236/49 |
| 4,284,943 | 8/1981 | Rowe | 318/806 |
| 4,407,185 | 10/1983 | Haimes et al. | 98/1.5 |
| 4,437,608 | 3/1984 | Smith | 236/13 |
| 4,491,061 | 1/1985 | Hishizawa et al. | 165/16 X |

FOREIGN PATENT DOCUMENTS 348720  5/1931  United Kingdom ................ 98/34.5

*Primary Examiner*—Harold Joyce
*Attorney, Agent, or Firm*—Walker & McKenzie

[57] ABSTRACT

An improved variable air volume air distribution system for distributing air within the interior of a building. The variable air volume air distribution system includes an air supply plenum, a supply fan for transferring air from the air supply plenum into the interior of the building, a return air plenum for receiving air from the conditioned space of the building, and an exhaust fan for exhausting air from the return air plenum to the outside atmosphere. The improvement includes a first pressure sensor located in the air supply plenum for sensing the air pressure within the air supply plenum; a second pressure sensor located in the return air plenum for sensing the air pressure within the return air plenum; and control structure for causing the exhaust fan to exhaust air from the return air plenum at a rate proportional to the ratio of the air pressure within the air supply plenum and the return air plenum.

4 Claims, 1 Drawing Sheet

VARIABLE AIR VOLUME AIR DISTRIBUTION SYSTEM

BACKGROUND OF THE INVENTION

1. Field of the Invention:

The present invention relates, in general, to the field of heating, ventilating and air conditioning systems and, more specifically, to a variable air volume distribution system.

2. Information Disclosure Statement:

It is common in heating, ventilating and air conditioning systems for commercial buildings and the like to vary the volume of air being forced into the conditioned space of the building rather than varying the temperature of the air. A major problem with such variable air volume systems is the need to exhaust substantially the same amount of air from the conditioned space as is being forced into the conditioned space to prevent the air pressure within the conditioned space from increasing or decreasing. One prior art method used with relative small buildings and the like is to merely install automatic relief vents in the building between the conditioned space and the outside atmosphere which will open when the air pressure within the conditioned space goes above a predetermined amount to allow the free passage of air between the conditioned space and the outside atmosphere. However, such a relative passive method is not satisfactory for relatively large buildings.

The inventor is aware of Smith, U.S. Pat. No. 4,437,608 which discloses a variable air volume building ventilation system in which the flow rate within the outside air duct is maintained substantially constant and may be set to substantially match the amount of air which will be normally exhausted from the building by exhaust fans and leakage such that the flow of air in and out of the building is balanced. Because of the relevancy of the Smith U.S. Pat. No. 4,437,608 patent to the present invention, the patents cited in the prosecution of the Smith U.S. Pat. No. 4,437,608 patent are listed below and may be relevant to the present invention: Jauss, U.S. Pat. No. 3,887,127 discloses an electrical control circuit for a ventilation system which is free of any switching device for changing from winter operation to summer operation; Lorenz, U.S. Pat. No. 3,611,906 discloses a ventilating system including dampers in the air inlet for a relatively closed building that are adjustably positioned by a reversible electric motor controlled so that although the velocity at which air is exhausted from the building may vary, the dampers regulate the inflow of air to provide a sustantially constant pressure differential between the interior and exterior of the building; Modes, U.S. Pat. No. 4,073,433, discloses a control apparatus to override the primary pneumatic circuitry of an air distribution system during warm-up cycles; Skinner, U.S. Pat. No. 4,145,161 discloses a speed control for the electric motor of an oil-well beam pumping unit; Knauth, U.S. Pat. No. 4,174,065 discloses a fluid flow regulating system for controlling the motor speed of fluid pumping devices; Robinson, U.S. Pat. No. 4,189,094 discloses a control system which automatically varies the degree of ventilation of an indoor swimming pool in response to variations in the outside temperature; Stewart et al, U.S. Pat. No. 4,191,511 discloses a control for the main gas stream from a compressor which automatically adjusts the amount of gas vented from the compressor output by a variable relief valve or other flow restriction means; Dehart, U.S. Pat. No. 4,251,027, discloses a variable volume control assembly for conditioned air systems and that operates with pressure independent control; Rowe, U.S. Pat. No. 4,284,943 discloses a control apparatus for maintaining a measured parameter of an environment in a closed-loop system within a range of the desired level for that parameter to an accuracy greater than that of the parameter measuring device in the closed-loop system; Haines et al, U.S. Pat. No. 4,407,185 discloses a variable air volume system in which the inflow of outside air is maintained above a predetermined value by maintaining a substantially fixed negative pressure in the plenum by the use of a static pressure sensor and control system for controlling the speed of the return fan.

None of the above methods or patents disclose or suggest the improved variable air volume air distribution system of the present invention including an air supply plenum, a supply fan for transferring air from the air supply plenum into the interior of a building, a return air plenum for receiving air from the conditioned space of the building, and an exhaust fan for exhausting air from the return air plenum to the outside atmosphere; the improvement including a first pressure sensor located in the air supply plenum for sensing the air pressure within the air supply plenum; a second pressure sensor located in the return air plenum for sensing the air pressure within the return air plenum; and control means for causing the exhaust fan to exhaust air from the return air plenum at a rate proportional to the ratio of the air pressures within the air supply plenum and the return air plenum.

SUMMARY OF THE INVENTION

The present invention is directed toward providing an improved variable air volume air distribution system. The concept of the present invention is to measure the pressure in the air supply plenum of a variable air volume air distribution system, to measure the pressure in the return air plenum of the distribution system, and to maintain the same ratio of the above-mentioned pressures by varying the speed of the exhaust fan of the distribution system so that the amount of air exhausted to the outside and the amount of air brought into the system from the outside will be substantially the same.

The improved variable air volume air distribution system of the present invention is for distributing air within the interior of a building or the like. The distribution system includes an air supply plenum, a supply fan for drawing air into the air supply plenum and for transferring air from the air supply plenum into the interior conditioned space of the building, a return air plenum for receiving air from the conditioned space of the building, and an exhaust fan for exhausting air from the return air plenum to the outside atmosphere. The improvement includes a first pressure sensor located in the air supply plenum for sensing the air pressure within the air supply plenum; a second pressure sensor located in the return air plenum for sensing the air pressure within the return air plenum; and control means for causing the exhaust fan to exhaust air from the return air plenum at a rate proportional to the ratio of the air pressures within the air supply plenum and the return air plenum.

DESCRIPTION OF THE PREFERRED EMBODIMENT

Figure 1:
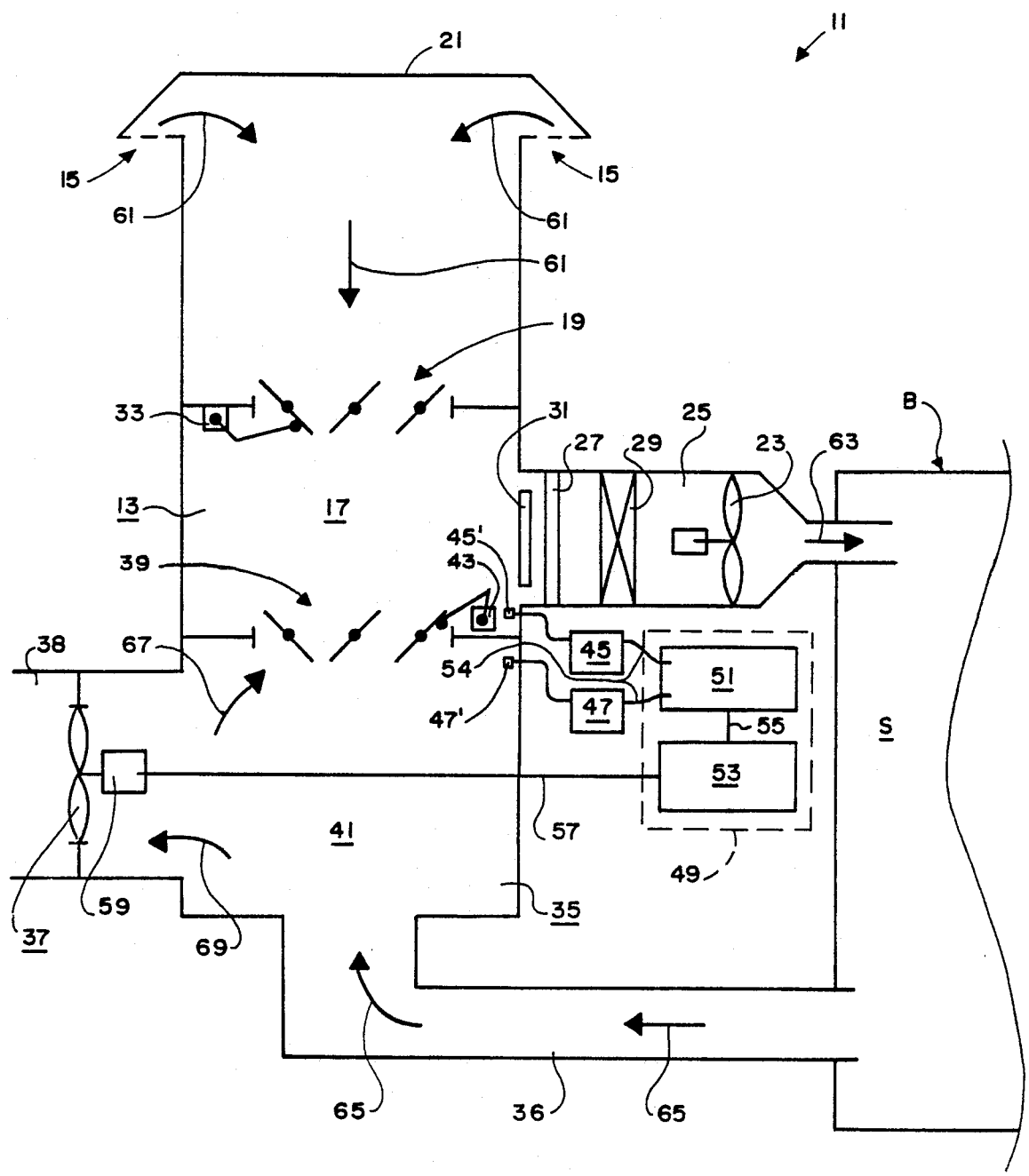
FIG. 1 is a schematic view of the variable air volume distribution system of the present invention shown in combination with a building.

The improved variable air volume air distribution system 11 of the present invention is for distributing air within the interior conditioned space S of a building B. The distribution system 11 may thus be part of an air conditioning system for providing heated and/or cooled air to the conditioned space S of the building B.

The distribution system 11 includes an air supply plenum 13, often referred to as a mixed air plenum, for providing a supply of air to be transferred into the conditioned space S of the building B. One or more air inlets 15 are provided for allowing air from the outside atmosphere or the like to enter the interior 17 of the air supply plenum 13. An air supply damper 19 is preferably provided to control the passage of air through the air inlets 15 into the interior 17 of the air supply plenum 13. A roof hood-like structure 21 or wall louver may be provided over the air supply damper 19 for defining the air inlets 15, etc., as will now be apparent to those skilled in the art.

The distribution system 11 includes a supply fan 23 for drawing air into the interior 17 of the air supply plenum 13 and for transferring air from the interior 17 of the air supply plenum 13 into the conditioned space S of the building B. More specifically, the supply fan 23 may be located in a conduit 25 extending from the interior 17 of the air supply plenum 13 to the conditioned space S of the building B to transfer air from the interior 17 of the air supply plenum 13 into the conditioned space S of the building B. The distribution system 11 may include the usual filter 27, cooling or heating coil(s) 29 and the like for filtering and conditioning the air being forced into the conditioned space S of the building B in a manner and for reasons as will now be apparent to those skilled in the art. The filter 27, coil(s) 29 and the like may be located in the conduit 25. The air supply damper 19 is preferably opened and closed by a conventional damper actuator 33. The operation of the damper actuator 33 is also preferably controlled by a thermostat 31 in any specific manner now apparent to those skilled in the art.

The distribution system 11 includes a return air plenum 35 for receiving air from the conditioned space S of the building B through a conduit 36 or the like, and an exhaust fan 37 for exhausting air from the return air plenum 35 to the outside atmosphere through a conduit 38 or the like. A return air damper 39 is preferably provided to allow the passage of air from the interior 41 of the return air plenum 35 into the interior 17 of the air supply plenum 13. The return air damper 39 is preferably opened and closed by a conventional damper actuator 43. The operation of the damper actuator 43 may also be controlled by the thermostat 31 in any specific manner now apparent to those skilled in the art. Thermostate 31 generally modulates dampers 19 and 34 to maintain the proper air temperature entering conduit 25. As one damper opens, the other closes in a manner apparent to those skilled in the art.

The improved variable air volume air distribution system 11 of the present invention includes a first pressure sensor means 45 having a sensor 45' located in the interior 17 of the air supply plenum 13 for sensing the air pressure within the air supply plenum 13; a second pressure sensor means 47 having a sensor 47' located in the interior 41 of the return air plenum 35 for sensing the air pressure within the return air plenum 35, and control means 49 for causing the exhaust fan 37 to exhaust air from the return air plenum 35 at a rate proportional to the ratio of the air pressures within the air supply plenum 13 and the return air plenum 35. The signals from the pressure sensor means 45, 47 may be pneumatic or electric. The control means 49 preferably includes a ratio controller or processor means 51 for processing the signals from the pressure sensor means 45, 47 and for converting the signals from the pressure sensor means 45, 47 to an electrical signal or the like proportional to the ratio of the pressure sensed by the pressure sensor means 45, 47. The control means 49 preferably includes an exhaust fan speed controller means 53 for receiving the electrical signal or the like from the ratio controller means 51 and for driving the exhaust fan 37 at a speed proportional to the ratio of the pressure sensed by the pressure sensor means 45, 47. The pressure sensor means 45, 47 typically provide signals to the processor 51 through lines 54. The processor 51 will process and convert the signals from the sensor means 45, 47 and provide a signal based thereon to the controller means 53 through line 55. The exhaust fan speed controller means 53 will then feed a signal through line 57 to the motor 59 of the exhaust fan 37.

The specific construction of the distribution system 11 may vary as will now be apparent to those skilled in the art. Thus, the plenums 13, 35 and conduits 25, 36, 38 may be preferably formed out of sheet metal in any manner now apparent to those skilled in the art. The dampers 19, 39 may be parallel or opposed blade or a combination thereof well known to those skilled in the art. The damper actuators 33, 43 should be furnished with pilot positioners and must be large enough to properly position the dampers 19, 39 and may be standard electric of pneumatic actuators well known to those skilled in the art. The thermostat 31 and fans 23, 37 may be standard off-the-shelf type units. The exhaust fan 37 may be a propeller, centrifugal or axial type that will meet the designed conditions well known to those skilled in the art. The pressure sensor means 45, 47 should be accurate to plus or minus one percent of full scale and may be chosen from any of the commercially available units that provide the desired functions well known to those skilled in the art, such as, for example, the model 391T manufactured by Combustion Engineering, Inc. of Rochester, NY. The ratio controller means 51 may be chosen from any of the commercially available units that provide the desired functions well known to those skilled in the art such as, for example, a model B Fulscope Ratio Controller manufactured by Combustion Engineering, Inc., of Rochester, NY. The exhaust fan speed contoller means 53 may be chosen from any of the commercially available units that provide the desired functions well known to those skilled in the art such as, for example, the Opti-Speed Drive produced by the Robicon Corp. of 100 Sagamore Hill Rd., Pittsburgh, Pa.

The operation of the distribution system 11 is as follows: First, with the air supply damper 19 open to allow air to enter the interior 17 of the air supply plenum 13 through the air inlets 15 and with the supply fan 23 activated, air will be drawn through the air inlets 15 into the interior 17 of the air supply plenum 13 as indicated by arrows 61 and will be forced into the conditioned space S of the building B through the conduit 25 as indicated by the arrow 63. Return air will be drawn from the conditioned space S through the conduit 36 and into the interior 41 of the return air plenum 35 as indicated by the arrows 65. With the return air damper 39 open, at least some of the air from the interior 41 of the return air plenum 35 will normally be drawn into the interior 17 of the air supply plenum 13 as indicated by the arrow 67 for being mixed with the air in the interior 17 of the air supply plenum 13 and being subsequently forced back into the conditioned space S through the conduit 25. With the exhaust fan 37 activated, at least some of the air from the return air plenum 35 will be forced through the conduit 38 to the outside atmosphere as indicated by arrow 69. The concept of the present invention is to measure the pressure in the interior 17 of the air supply plenum 13 and the interior 41 of the return air plenum 35 and to maintain the same ratio of pressures by varying the speed of the exhaust fan 37 so that the amount of air exhausted to the outside atmosphere and the outside air brought into the distribution system 11 will be substantially the same. Thus, the pressure in the air supply plenum 13 is sensed by the first pressure sensor means 45 and the pressure in the return air plenum 35 is sensed by the second pressure sensor 47. These signals are sent to the control means 49 which controls the speed of the exhaust fan 37 depending on the sensed air pressures in the plenums 13, 35 to maintain the ratio of the air pressures in the plenums 13, 35 at a predetermined figure. For example, if the sensed pressure in the return air plenum as compared to the sensed pressure in the air supply plenum 13 is too low for the predetermined ratio, the speed of the exhaust fan 37 will be reduced. Conversely, if the sensed pressure in the return air plenum as compared to the sensed pressure in the air supply plenum 13 is too high for the predetermined ratio, the speed of the exhaust fan 37 will be increased. It should be understood that the thermostat 31 is set at a desired temperature and will modulate the dampers 19, 39 via the damper actuators 33, 43 and the air conditioning unit 29, etc., to maintain the temperature at the set amount. When the conditions change to bring in different volumes of outside air into the distribution system 11, the present invention will cause the ratio of the pressures in the air supply plenum 13 and the return air plenum 35 to remain constant so the volume of air exhausted by the exhaust fan 37 will be the same as the volume of outside air that is brought into the distribution system 11 through damper 19.

Although the present invention has been described and illustrated with respect to a preferred embodiment and a preferred use therefor, it is not to be so limited since modifications and changes can be made therein which are within the full intended scope of the invention. For example, controller 49 may operate an exhaust fan inlet damper or a discharge damper or a blade pitch actuator or other air volume control means well known to those skilled in the art.

I claim:

1. An improved variable air volume air distribution system for distributing air within the interior conditioned space of a building, said distribution system including an air supply plenum for providing a supply of air to be transferred into the conditioned space of a building; a supply fan for drawing air into the interior of the air supply plenum and for transferring air from the interior of the air supply plenum into the conditioned space of the building; a return air plenum for receiving air from the conditioned space of the building; and an exhaust fan for exhausting air from the return air plenum to the outside atmosphere; and improvement comprising:
   (a) a first pressure sensor means for sensing the air pressure within the air supply plenum;
   (b) a second pressure sensor means for sensing the air pressure within the return air plenum; and
   (c) control means for causing the exhaust fan to exhaust air from the return air plenum at a rate proportional to the ratio of the air pressures within the air supply plenum and the return air plenum.

2. The improvement of claim 1 in which said first pressure sensor means provides a signal based on the sensed air pressure within the air supply plenum, in which said second pressure sensor means provides a signal based on the sensed air pressure within the return air plenum, and in which said control means includes a ratio controller means for processing said signals from said pressure sensor means and for converting said signals from said pressure sensor means to a signal proportional to said ratio of said pressure sensed by said pressure sensor means.

3. The improvement of claim 2 in which said control means includes an exhaust fan speed controller means for receiving said signal from said ratio controller means and for driving said exhaust fan at a speed proportional to said ratio of said pressure sensed by said pressure sensor means.

4. A variable air volume air distribution system for distributing air within the interior of a building, said distribution system comprising:
   (a) an air supply plenum;
   (b) a supply fan for transferring air from said air supply plenum into said interior of said building;
   (c) a return air plenum for receiving air from said conditioned space of said building;
   (d) an exhaust fan for exhausting air from said return air plenum to the outside atmosphere;
   (e) a first pressure sensor located in said air supply plenum for sensing the air pressure within said air supply plenum and for providing a signal based on the sensed air pressure within said air supply plenum;
   (f) a second pressure sensor located in said return air plenum for sensing the air pressure within said return air plenum and for providing a signal based on the sensed air pressure within said return air plenum; and
   (g) control means for causing said exhaust fan to exhaust air from said return air plenum at a rate proportional to the ratio of the air pressures within said air supply plenum and said return air plenum; said control means including a ratio controller means for processing said signals from said pressure sensor means and for converting said signals from said pressure sensor means to a signal proportional to said ratio of said pressure sensed by said pressure sensor means and including an exhaust fan speed controller means for receiving said signal from said ratio controller means and for driving said exhaust fan at a speed proportional to said ratio of said pressure sensed by said pressure sensor means.

* * * * *